(12) United States Patent
Dacosta

(10) Patent No.: US 7,716,321 B2
(45) Date of Patent: May 11, 2010

(54) METHOD AND SYSTEM FOR PROVIDING RECOMMENDATIONS FOR INTERNET CONTENT PROVIDERS

(75) Inventor: Behram Mario Dacosta, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 416 days.

(21) Appl. No.: 11/591,091

(22) Filed: Nov. 1, 2006

(65) Prior Publication Data

US 2008/0104228 A1 May 1, 2008

(51) Int. Cl.
 *G06F 15/173* (2006.01)
(52) U.S. Cl. .................. 709/223; 709/224; 370/229; 348/192
(58) Field of Classification Search ............. 709/203, 709/223, 224
 See application file for complete search history.

(56) References Cited

U.S. PATENT DOCUMENTS

| 6,366,314 | B1 | 4/2002 | Goudezeune et al. | ....... 348/192 |
|---|---|---|---|---|
| 6,738,353 | B2 | 5/2004 | Cong | .......... 370/241 |
| 6,965,597 | B1 | 11/2005 | Conway | ....... 370/389 |
| 7,154,533 | B2 * | 12/2006 | Sheldon et al. | .......... 348/192 |
| 2002/0120727 | A1 * | 8/2002 | Curley et al. | ............ 709/223 |
| 2005/0063303 | A1 * | 3/2005 | Samuels et al. | ............ 370/229 |
| 2007/0091848 | A1 * | 4/2007 | Karia et al. | .......... 370/331 |
| 2007/0201500 | A1 * | 8/2007 | Deshpande | .......... 370/412 |
| 2007/0288630 | A1 * | 12/2007 | De Noia et al. | ............ 709/224 |

OTHER PUBLICATIONS

Client Profiling for QoS-Based Web Service Recommendation, Niko Thio and Shanika Karunasekera (NICTA Victoria Laboratory); Department of Computer Science and Software Engineering (University of Melbourne, Australia), (Publication Date: Dec. 15-17, 2005).*

"Telecommunications and Internet converged Services and Protocols for Advanced Networking (TISPAN); Review of available material on QoS requirements of Multimedia Services" Feb. 2006 Technical Report from internet web site: http://webapp.etsi.org/action/PU/20060228/tr_102479v010101p.pdf.

* cited by examiner

*Primary Examiner*—Yves Dalencourt
(74) *Attorney, Agent, or Firm*—John L. Rogitz

(57) ABSTRACT

A user's content presentation device automatically measures the technical objective quality of an Internet video stream and/or estimates the perceived subjective quality of the stream, and provides feedback to the user regarding one or both of these estimates.

20 Claims, 2 Drawing Sheets

METHOD AND SYSTEM FOR PROVIDING RECOMMENDATIONS FOR INTERNET CONTENT PROVIDERS

I. FIELD OF THE INVENTION

The present invention relates generally to systems and methods for providing recommendations for Internet content providers based on quality metrics.

II. BACKGROUND OF THE INVENTION

The video (and audio) obtained from many Internet sites for display on Internet TVs is of poor quality for various reasons, including quality of original encoding and network conditions. For example, a user might view Internet video on a device and might be presented with a menu with 300 different Internet sites that provide Internet TV content, and as recognized herein it is unfortunately the case that the video (and audio) obtained from many of these web sites may be of poor quality owing to a low encoded bit rate of the original content, as well as owing to packet drops, jitter, latency, and other problems caused by the network between the content server and the user's content presentation device.

As understood herein, such network problems may be caused by inadequate capabilities of the streaming server (e.g. CPU power, bus bandwidth) for the number of streams it is providing simultaneously to different viewers. Network problems may also be caused by inadequate bandwidth of the access link from the server to the Internet, as well as by inadequate bandwidth of the access link from the Internet to the user's content presentation device.

The present invention also recognizes that from the perspective of a user in his house, content from certain Internet TV sites will consistently provide content that is superior in technical quality to content from other Internet TV sites. In addition, some Internet TV sites may consistently be sources of video that may have unacceptably poor quality when viewed on the user's content presentation device. The problem then becomes how a user might determine which Internet sites are preferable with regard to technical quality of content, and once this is determined, how a user might remember the quality of content from various sites for future reference. With these critical recognitions in mind, the invention herein is provided.

SUMMARY OF THE INVENTION

A content presentation device includes a processor, an Internet interface configured to receive audio/video signals from the Internet, and a monitor for presenting audio/video. The processor determines a quality of service (QoS) and/or quality of experience (QoE) for signals from Web sites on the Internet and causes an indication of the QoS and/or QoE to be presented on the monitor along with an indication of the associated Web site.

In one non-limiting implementation, the QoS is determined based on packet error rates (PER) and/or packet jitter and/or packet round-trip times (RTT) and/or streaming protocol and/or video codec and/or source content bit-rate. In this non-limiting implementation, QoS may be directly proportional to the source bit rates and can be inversely proportional to PER, packet jitter, and packet RTT. In preferred non-limiting embodiments the content presentation device includes a video decoder and a dejitter buffer, and QoS is measured on signals input to the video decoder after the dejitter buffer.

If desired, QoS may be used to derive a QoE, with the QoE modifying QoS to account for at least one device-specific parameter and with an indication of QoE being presented on the monitor. The parameter may include, e.g., error concealment that may be implemented by the processor of the content presentation device and/or content presentation capabilities of the monitor. A TV tuner may be provided in the device.

In another aspect, a method for presenting a user with an indication of quality of video received from plural Web sites includes, for each Web site, determining a QoS and/or QoE representing the quality of video from the Web site, and then presenting a graphical user interface (GUI) on a monitor listing the Web sites along with corresponding indications of QoS/QoE associated therewith.

In yet another aspect, a system has means for digitally processing signals, means for displaying video streams, and means for receiving Internet signals. Logic means are provided that can be executed by the means for digitally processing for causing the means for displaying to display sources of Internet signals in a first column and indications of signal quality from the sources in a second column juxtaposed with the first column.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

As set forth in detail below, a content presentation device automatically measures the technical objective quality of an audio/video stream from the Internet and/or estimates the perceived subjective quality of the stream, and then provides feedback to the user regarding one or both of these estimates via a GUI on the content presentation device.

Figure 1:
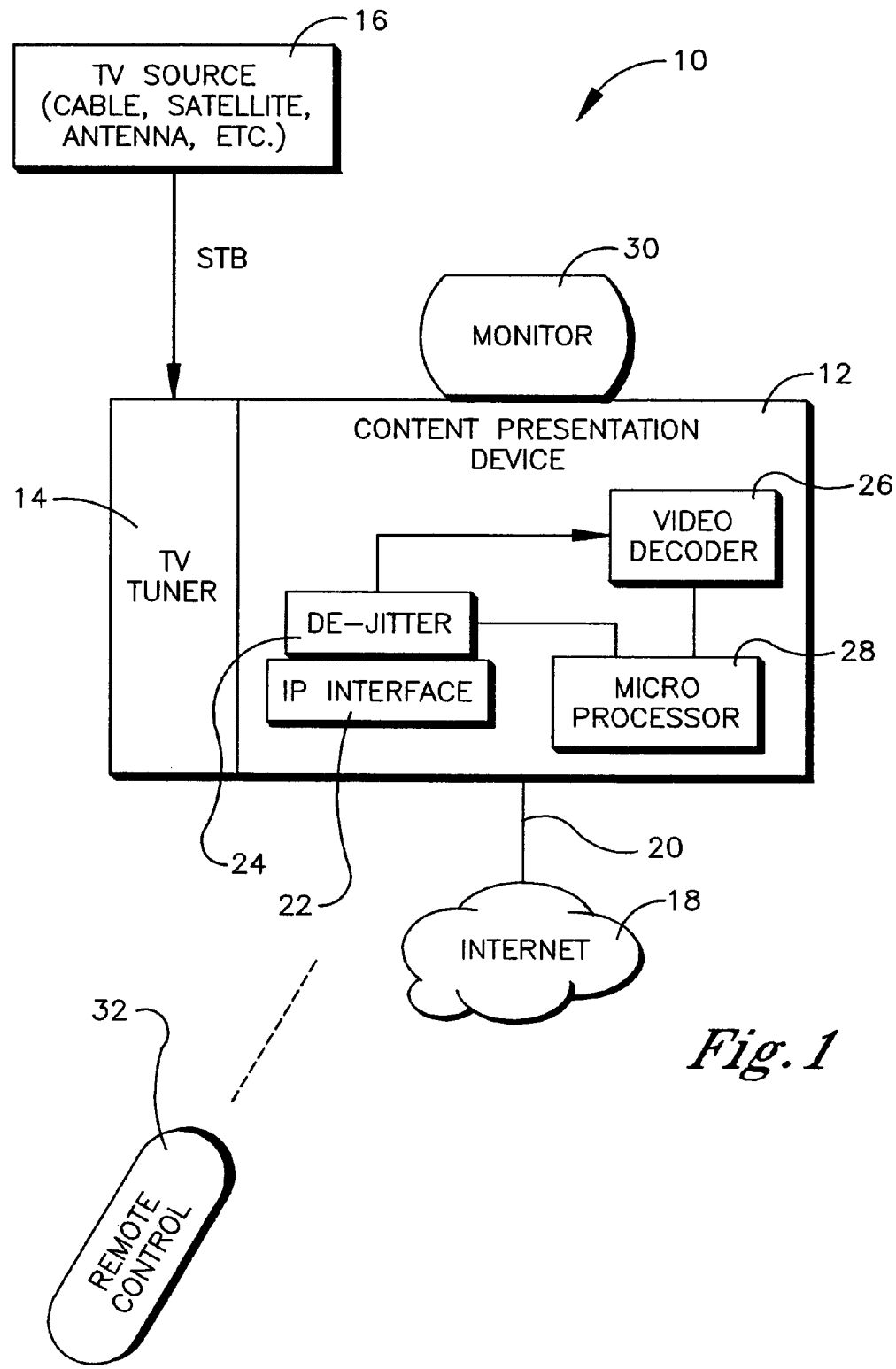
FIG. 1 is a block diagram of a non-limiting system that can embody the present invention.

Referring initially to FIG. 1, a system is shown, generally designated 10, which includes a content presentation device 12. The content presentation device 12 may be any suitable device that can display audio-video content from the Internet as well as televised content, and in the embodiment shown is an Internet protocol TV (IPTV) with TV tuner 14 that can receive TV signals from one or more TV sources 16 such as satellites, cable TV, antennae, etc. As indicated in FIG. 1, the TV signals may be sent through a set-top box (STB) that is associated with the content presentation device 12, it being understood that the logic herein may be performed in the STB or by the below-described TV processor, and that the STB may be housed integrally or separately from the content presentation device 12.

In any case, the content presentation device 12 receives audio/video content from Web sites (such as Internet TV web sites) on the Internet 18 via a wired or wireless Internet connection 20. The signals are received at an IP interface 22 such as but not limited to a modem and may be processed by IP electronics known in the art, which may include a de-jitter buffer 24 and a video decoder 26 that can be controlled by a TV processor 28. Both Internet and TV signals can be presented on a monitor 30 under control of the TV processor 28. A wireless hand-held remote control device 32 may also be provided to enable a user to control the content presentation device 12.

Figure 2:
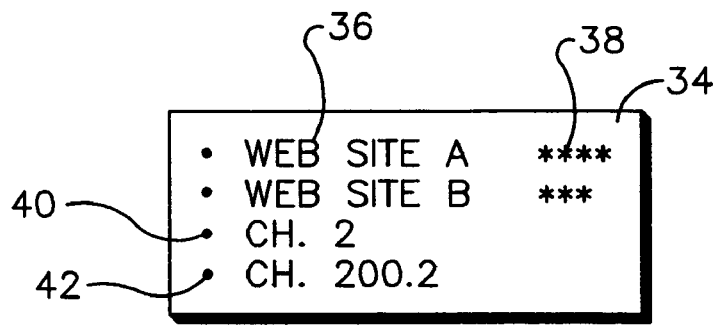
FIG. 2 is a non-limiting screen shot of a graphical user interface (GUI) that can be generated by the present logic.

FIG. 2 shows a non-limiting screen shot of a GUI that can be generated by the logic discussed further below for presentation on the monitor 30 to give a user an indication of the quality of video and/or audio being received from various Web sites. As shown, a Web site name column 36 can list the names of Web sites, while a quality column 38 can provide an indication of the quality of signal being received from the corresponding Web site. In the example shown, the quality can be indicated by a number of stars, with one star indicating poor quality and five stars indicating excellent quality, it being understood that other quality indications may be used. So, for instance, Web site A is indicated as having four star quality while Web site B is indicated as having three star quality. Analog TV channels 40 and digital TV channels 42 may also be presented on the GUI of FIG. 2.

Figure 3:
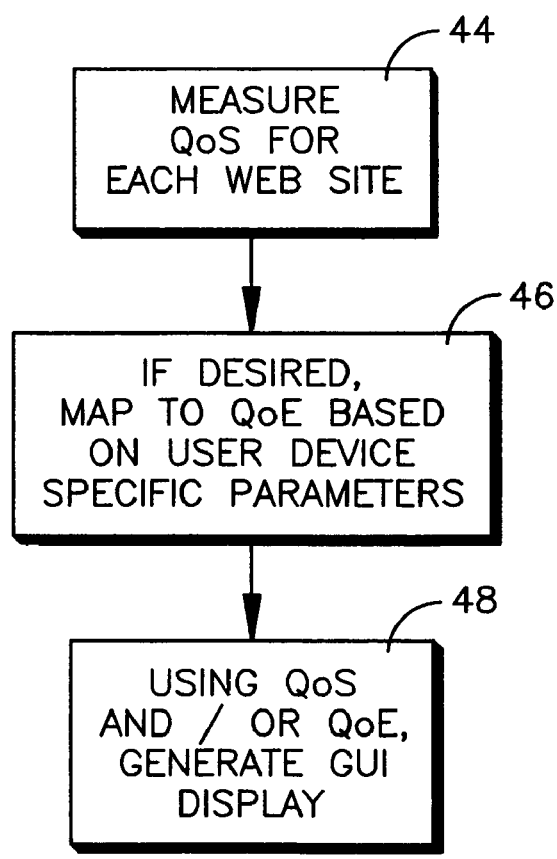
FIG. 3 is a flow chart of a non-limiting implementation of the present logic.

Turning now to FIG. 3 to understand the present logic, commencing at block 44, the stream from a Web site as received at the content presentation device 12 is analyzed to measure at least one and preferably all the following. Packet error rates (PER) before and after automatic retransmit requests can be measured, as well as packet jitter, packet round-trip times (RTT), and streaming protocol. Also, the received video codec and source content bit-rate can be measured. In one non-limiting implementation, the above measurements advantageously can be performed on signals at the input to the video decoder 26 of the content presentation device 12, after the dejitter buffer 24 and after any automatic retransmit requests that might be made. These measurements are used to establish a QoS estimate. In one implementation the QoS estimate is directly proportional to the source bit rates (and can depend on video codec being used) and is inversely proportional to PER, packet jitter, and packet RTT.

As understood herein, QoS is not necessarily a measurement of what might be thought of as Quality of Experience (QoE), i.e., the perceived content quality to the user. Accordingly, at block 46 the QoS determined at block 44 can be mapped to a QoE estimate, which takes into account factors such as the error concealment algorithms in the content decoder 26 (e.g., the video concealment of lost packets by the MPEG AVC decoder) on the specific content presentation device 12, content presentation capabilities of the specific content presentation device 12 (e.g., light emission persistence of the display device, resolution and size of the display device), as well as psychophysical measures of human perception (e.g., the degree of sensitivity of the human perceptual system to different types of visual artifacts).

More generally, QoE modifies QoS to account for device-specific parameters such as error concealment. As but one non-limiting example, if the specific content presentation device 12 implements powerful error concealment algorithms that can, e.g., conceal 15% of errors caused by packet jitter, then the contribution of packet jitter to QoS determined at block 44 may be altered by 15% to generate a QoE that is higher than the QoS otherwise would be. As another non-limiting example, a resolution and size of the monitor 30 that is greater than some nominal resolution and size would tend to magnify the perception of poor quality while a resolution and size of the monitor 30 that is less than some nominal resolution and size would tend to diminish perception of poor quality. Accordingly, a relatively low QoS might be lowered even further by some empirically determined amount for the former case and raised somewhat for the latter case to arrive at a QoE.

The QoS (and if provided, QoE) measures for a Web site advantageously can be determined when a user of the content presentation device 12 views content from that site. The measures are recorded and are used at block 48 to generate the GUI shown in FIG. 2.

In one non-limiting implementation, the QoS and/or QoE measures for each Web site measured are fed back in the menu shown in FIG. 2, listing sites offering Internet TV content. As discussed above, as an example each site name may be followed by a number of stars (between, e.g., one and five stars), with a greater number of stars indicating a greater expected quality of the stream that will be received from the respective Web site by the content presentation device 12.

In some implementations, a user may be provided with the ability to deselect from the GUI list shown in FIG. 2, using, e.g., the remote control 32, Web sites having below a certain indicated QoS/QoE, e.g., two stars or below, since these may provide content of simply too poor quality. For example, a user may input a command to the TV processor to "list only sites with quality three stars and above."

In content presentation systems that automatically provide alternate sources for the same content to the user, the present invention similarly causes the various options for content source to be listed together with the star ranking for each source. The user is then free to select the source of required star ranking taking into account other issues such as content cost that may vary across content sources. Alternatively, the system may choose to present to the user only the content, or content source, corresponding to the source with higher star ranking.

For mobile devices, the determination of whether a specific segment on the link from the Web Internet server to the content presentation device 12 is causing poor quality is important. This is because, as a mobile content presentation device 12 moves from one geographic location to another, different intermediate network segments may be used by the stream. Therefore, for mobile devices, QoE and QoS may be used only to provide feedback for measures recorded at the same location as the content presentation device 12 presently is. Note that the content presentation device 12 "location" may be considered to be GPS-type geographical location, or location relative to network segments.

While the particular METHOD AND SYSTEM FOR PROVIDING RECOMMENDATIONS FOR INTERNET CONTENT PROVIDERS is herein shown and described in detail, it is to be understood that the subject matter which is encompassed by the present invention is limited only by the claims.

What is claimed is:

1. A consumer content presentation device, comprising:
    at least one processor;
    at least one Internet interface configured to receive audio/video signals from the Internet; and
    at least one monitor for presenting the audio/video signals to an end consumer, wherein
        the processor determines a quality of service (QoS) and/or quality of experience (QoE) for signals from at least one Web site on the Internet and causes an indication of the QoS and/or QoE to be presented on the monitor along with an indication of the associated Web site such that the end consumer can ascertain the QoS and/or QoE being provided by the Web site.
2. The content presentation device of claim 1, wherein the QoS is determined based at least in part on packet error rates (PER) and/or packet jitter and/or packet round-trip times (RTT) and/or streaming protocol and/or video codec and/or source content bit-rate.

3. The content presentation device of claim 2, wherein QoS is directly proportional to the source bit rates and is inversely proportional to PER, packet jitter, and packet RTT.

4. The content presentation device of claim 3, wherein the content presentation device includes a video decoder and a dejitter buffer, and QoS is measured on signals input to the video decoder after the de-jitter buffer.

5. The content presentation device of claim 1, wherein QoS is used to derive a QoE, the QoE modifying QoS to account for at least one device-specific parameter, an indication of QoE being presented on the monitor.

6. The content presentation device of claim 5, wherein the parameter includes error concealment.

7. The content presentation device of claim 5, wherein the parameter includes content presentation capabilities of the monitor.

8. The content presentation device of claim 1, further comprising a TV tuner.

9. A method for presenting an end consumer user with an indication of quality of video received from plural Web sites, comprising:
for each Web site, determining at least a QoS and/or QoE representing the quality of video from the Web site relative to an end consumer video monitor receiving video from the web site; and
presenting a graphical user interface (GUI) on a monitor listing the Web sites along with corresponding indications of the QoS/QoE associated therewith.

10. The method of claim 9, comprising:
determining QoS based at least in part on packet error rates (PER) and/or packet jitter and/or packet round-trip times (RTT) and/or streaming protocol and/or video codec and/or source content bit-rate.

11. The method of claim 10, wherein QoS is directly proportional to the source bit rates and is inversely proportional to PER, packet jitter, and packet RTT.

12. The method of claim 9, comprising measuring QoS on signals input to a video decoder after a de-jitter buffer.

13. The method of claim 9, wherein QoS is used to derive a QoE, the QoE modifying QoS to account for at least one device-specific parameter.

14. The method of claim 13, wherein the parameter includes error concealment.

15. The method of claim 13, wherein the parameter includes content presentation capabilities of the monitor.

16. A system comprising:
means embodied in an end user display device for digitally processing signals;
means embodied in the end user display device for displaying video streams;
means embodied in the end user display device for receiving Internet signals; and
logic means embodied in the end user display device and executable by the means for digitally processing for causing the means for displaying to display sources of Internet signals in a first column and indications of signal quality from the sources in a second column juxtaposed with the first column.

17. The system of claim 16, wherein means for digitally processing includes a processor, the means for digitally displaying includes a monitor, and the logic means are embodied on a memory.

18. The system of claim 17, wherein the indications of signal quality represent QoS that is directly proportional to the source bit rates and is inversely proportional to PER, packet jitter, and packet RTT.

19. The system of claim 17, wherein the indications of signal quality represent a QoE accounting for error concealment and/or content presentation capabilities of the monitor.

20. The system of claim 16, comprising a TV tuner.

* * * * *